US008269108B2

(12) United States Patent
Kunishi et al.

(10) Patent No.: US 8,269,108 B2
(45) Date of Patent: Sep. 18, 2012

(54) TRANSPARENT CONDUCTIVE FILM AND CONDUCTIVE SUBSTRATE USING THE SAME

(75) Inventors: Yousuke Kunishi, Gyoda (JP); Hideki Suzuki, Tokyo (JP); Hiroto Komatsu, Saitama (JP); Junichi Ikeno, Saitama (JP)

(73) Assignees: Shin Etsu Polymer Co., Ltd. (JP); National University Corporation Saitama University (JP)

( * ) Notice: Subject to any disclaimer, the term of this patent is extended or adjusted under 35 U.S.C. 154(b) by 0 days.

(21) Appl. No.: 13/076,575

(22) Filed: Mar. 31, 2011

(65) Prior Publication Data
US 2011/0291058 A1    Dec. 1, 2011

Related U.S. Application Data

(63) Continuation of application No. PCT/JP2010/003598, filed on May 28, 2010.

(51) Int. Cl.
H01B 7/00 (2006.01)
H05K 1/09 (2006.01)
(52) U.S. Cl. ............. 174/113 R; 174/114 R; 174/114 S; 174/117 AS; 174/251; 174/261; 345/80; 345/81
(58) Field of Classification Search .................. 428/209; 174/117 FF, 251, 113 R, 114 R, 114 S, 117 AS, 174/261; 345/80–85
See application file for complete search history.

(56) References Cited

U.S. PATENT DOCUMENTS

| 4,182,553 | A  | * | 1/1980 | Sheridon .......................... 349/21 |
| 5,638,084 | A  | * | 6/1997 | Kalt ................................ 345/31 |
| 6,862,016 | B2 | * | 3/2005 | Matsuura et al. ............. 345/107 |
| 6,988,925 | B2 | * | 1/2006 | Arthur et al. .................... 445/46 |
| 7,027,029 | B2 | * | 4/2006 | Yamaguchi et al. .......... 345/107 |
| 7,332,432 | B2 | * | 2/2008 | Nakamura et al. ............. 438/677 |
| 7,411,620 | B2 | * | 8/2008 | Taniguchi et al. ............. 348/294 |
| 7,642,463 | B2 | * | 1/2010 | Guiheen et al. .......... 174/117 FF |
| 7,727,578 | B2 | * | 6/2010 | Guiheen et al. ................. 427/58 |
| 7,960,027 | B2 | * | 6/2011 | Guiheen et al. ............. 428/423.1 |
| 8,044,926 | B2 | * | 10/2011 | Shoji ............................ 345/107 |

FOREIGN PATENT DOCUMENTS

| JP | 2004-118381 | 4/2004 |
| JP | 2005-527048 | 9/2005 |
| JP | 2008-091116 | 4/2008 |

(Continued)

OTHER PUBLICATIONS

International Search Report and Written Opinion mailed Aug. 24, 2010 in corresponding International Application No. PCT/JP2010/003598.
Written Opinion mailed Aug. 24, 2010 in corresponding PCT International Application No. PCT/2010/003598, with partial English translation thereof.

(Continued)

*Primary Examiner* — Cathy Lam
(74) *Attorney, Agent, or Firm* — Ostrolenk Faber LLP

(57) ABSTRACT

A transparent conductive film (12, 22) including a transparent base material (2) having insulation properties; and a mesh member made of a conductive metal and provided in the transparent base material (2), wherein the transparent base material (2) is provided with a conductive portion in which the mesh member is arranged, and an insulating portion (I) in which a gap (5) formed by removing the mesh member is arranged.

14 Claims, 9 Drawing Sheets

FOREIGN PATENT DOCUMENTS

| | | |
|---|---|---|
| JP | 2008-300063 | 12/2008 |
| JP | 2009-026639 | 2/2009 |
| JP | 2010-044968 | 2/2010 |
| JP | 2010-077186 | 4/2010 |
| JP | 2010-140589 | 6/2010 |
| JP | 2010-157400 | 7/2010 |
| WO | WO 03/100715 | 12/2003 |
| WO | WO 2006/126604 | 11/2006 |

* cited by examiner

TRANSPARENT CONDUCTIVE FILM AND CONDUCTIVE SUBSTRATE USING THE SAME

TECHNICAL FIELD

The present invention relates to a transparent conductive film that is provided in the front surface of an image display device such as a touch panel, an electromagnetic shield of a plasma display, or the like, and to a conductive substrate that uses the transparent conductive film.

BACKGROUND ART

In a touch panel, an input device having a conductive substrate, in which a transparent conductive layer (transparent conductive film) is formed on the surface of a transparent insulating substrate, is provided as an electrode sheet in the front surface of an image display device such as a liquid crystal display.

As a material that constitutes the transparent conductive layer in the conductive substrate of an input device, tin-doped indium oxide (ITO) or π-conjugated conductive polymers (organic conductors) represented by polyethylenedioxythiophene/polystyrene sulfonate are widely known.

Incidentally, in the conductive substrate used in an input device for touch panels, a circuit pattern or an antenna array pattern is formed at times.

In terms of the method for forming patterns, for example, in Patent Document 1, a method has been disclosed, in which a transparent conductive layer is formed all over the surface of a transparent base material by coating, followed by removal of the transparent conductive layer at a portion to be insulated through ablation by irradiating a $CO_2$ laser beam or a YAG laser beam that uses a Q switch and having a pulse width of about 100 nanoseconds.

In Patent Documents 2 and 3, methods for forming a conductive portion with a predetermined pattern on the surface of a transparent base material by a printing method such as a screen printing method and a gravure printing method have been disclosed.

In Patent Document 4, a method has been disclosed, in which a transparent conductive layer is formed all over the surface of a transparent base material by coating, followed by removal of the transparent conductive layer at a portion to be insulated by plasma etching.

In Patent Document 5, a technique for forming a conductive pattern has been disclosed, in which a laser beam is irradiated for insulation onto a transparent conductive film that is made by dispersing and hardening a metal nanowire (metal microfiber) in a binder (resin). Note that the metal nanowire projected outside the transparent conductive film is removed by laser.

In Patent Document 6, a technique for forming a fine pattern, by means of fine ablation of the order of about 10 μm, by using an ultraviolet laser with respect to an ITO deposited substrate for touch panels, controlling the focal length between the beam diameter and the lens, and controlling the processing width within a light condensing area.

PRIOR ART DOCUMENTS

Patent Documents

[Patent Document 1] Japanese Unexamined Patent Application, First Publication No. 2004-118381
[Patent Document 2] Japanese Unexamined Patent Application, First Publication No. 2005-527048
[Patent Document 3] Japanese Unexamined Patent Application, First Publication No. 2008-300063
[Patent Document 4] Japanese Unexamined Patent Application, First Publication No. 2009-26639
[Patent Document 5] Japanese Unexamined Patent Application, First Publication No. 2010-44968
[Patent Document 6] Japanese Unexamined Patent Application, First Publication No. 2008-91116

DISCLOSURE OF INVENTION

Problems to be Solved by the Invention

In general, the above-mentioned organic conductor is colored in green to blue, and ITO is colored in pale yellow. For this reason, when forming a conductive pattern on an insulating substrate by the methods of Patent Documents 1 to 4, a conductive portion will be colored by a color which is intrinsic to the conductor forming each conductive films whereas an insulating portion constituted only of the insulating substrate will be colorless. Accordingly, when installing the obtained conductive substrate in the front surface of an image display device, a problem arises in that the conductive pattern becomes visible.

On the other hand, the technique disclosed in Patent Document 5 has an advantage in that the conductive pattern is hardly visible. However, since the metal nanowire is remained not only in the conductive portion but also in the insulating portion inside the transparent conductive film, it has been difficult to reliably conduct an insulation process. In other words, in order to reliably insulate the insulating portion, it is necessary to control the thickness of the transparent conductive film.

In addition, in the technique disclosed in Patent Document 6, since it is necessary to employ an ultraviolet laser that uses high-order harmonics for processing, and also to adjust the laser beam diameter or the zoom lens focal length for the sake of controlling the width of an ablation region, there is a problem in that it is difficult for a commercially available laser processing machine to satisfy the requirements.

The present invention has been made in view of the above circumstances, and has an object of providing a transparent conductive film with a conductive pattern, which is hardly visible, and also capable of achieving a stable electric performance by reliably insulating an insulating portion, and a conductive substrate that uses the transparent conductive film.

Means for Solving the Problems

In order to achieve the above object, the present invention proposes the following aspects.

That is, the present invention is a transparent conductive film that includes a transparent base material having insulation properties; and a mesh member made of a conductive metal and provided in the transparent base material, and characterized in that the transparent base material is provided with a conductive portion in which the mesh member is arranged, and an insulating portion in which a gap formed by removing the mesh member is arranged.

In addition, in the transparent conductive film according to the present invention, the mesh member may be made of metal microfibers that are dispersed and electrically connected with each other in the transparent base material.

Further, in the transparent conductive film according to the present invention, the metal microfibers may be mainly composed of silver.

Also, in the transparent conductive film according to the present invention, the gap in the insulating portion may be formed by irradiating a pulsed laser onto the mesh member.

Moreover, in the transparent conductive film according to the present invention, the pulsed laser may be an ultrashort pulse laser with a pulse width of less than 1 picosecond.

Furthermore, in the transparent conductive film according to the present invention, the pulsed laser may be a YAG laser or a $YVO_4$ laser.

In addition, the conductive substrate of the present invention is characterized in that the aforementioned transparent conductive film is provided at least on one surface of an insulating substrate.

Further, in the conductive substrate according to the present invention, the insulating substrate may be transparent.

Effects of the Invention

In accordance with the transparent conductive film and the conductive substrate that uses the transparent conductive film according to the present invention, a conductive pattern is hardly visible, and also a stable electric performance can be achieved by reliably insulating an insulating portion.

BEST MODE FOR CARRYING OUT THE INVENTION

The transparent conductive film and the conductive substrate that uses the transparent conductive film of the present invention can be applied to a product, in which a wiring pattern is formed in a transparent portion, for example, a transparent antenna, a transparent electromagnetic shield, and a transparent input device such as a transparent touch panel of a capacitance type or a membrane type. In addition, the transparent conductive film and the conductive substrate that uses the transparent conductive film of the present invention can be used in a three dimensional product, such as a capacitance input device associated with the handle of an automobile or the like, or for the sake of forming an electrode required in a capacitance sensor or the like, which is provided in the surface of a three dimensional decorative product. It should be noted that the term "transparent" used in the present embodiment refers to a material that exhibits a light transmittance of 50% or higher.

Figure 1:
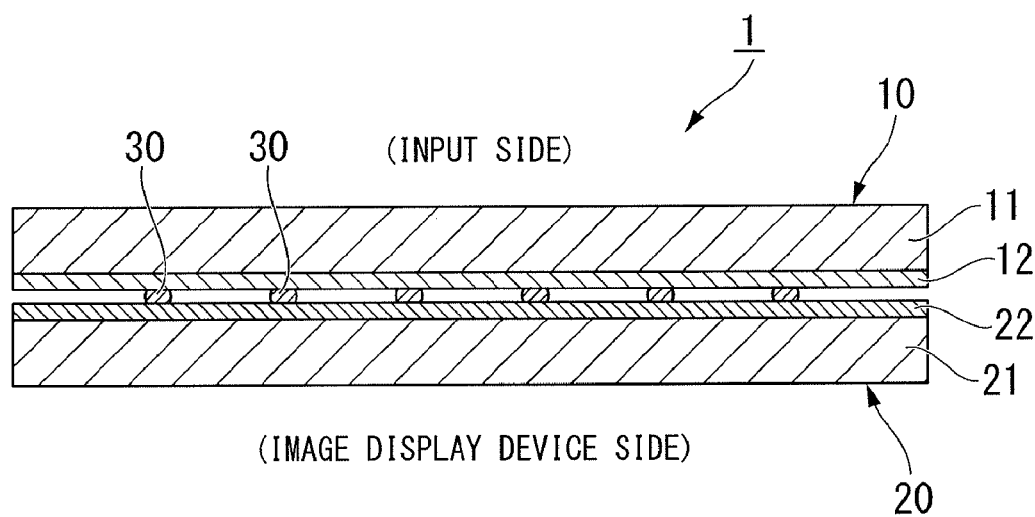
FIG. 1 is a sectional side view showing a simplified input device employing a transparent conductive film and a conductive substrate that uses the transparent conductive film according to an embodiment of the present invention.

FIG. 1 shows an input device 1 that employs a transparent conductive film and a conductive substrate according to an embodiment of the present invention.

The input device 1 is a resistive film type touch panel which includes a conductive substrate 10 arranged on the input side, a conductive substrate 20 arranged on the image display device side so as to face the conductive substrate 10, and a transparent dot spacer 30 provided between these substrates.

The conductive substrate 10 includes a transparent insulating substrate 11 and a transparent conductive film 12 provided at least on the surface of the insulating substrate 11 which faces the image display device side.

The conductive substrate 20 includes a transparent insulating substrate 21 and a transparent conductive film 22 provided at least on the surface of the insulating substrate 21 which faces the input side.

As the insulating substrates 11 and 21, it is preferable to use a substrate that has insulation properties and is capable of forming the transparent conductive film 12 or 22 on the surface, and also hardly changes the appearance under predetermined irradiation conditions when subjected to a laser processing to be described later. Specific examples thereof include insulating materials such as glass, polycarbonate, polyesters represented by polyethylene terephthalate (PET), and acrylonitrile/butadiene/styrene copolymer resin (ABS resin). In addition, with respect to the shape of the insulating substrates 11 and 21, a plate substrate, a flexible film substrate, a sterically (three dimensionally) molded product, or the like can be used.

When using the input device 1 in a transparent touch panel, a glass plate, a PET film or the like is used for the insulating substrates 11 and 21. In addition, when using the input device 1 as an electrode required in a capacitance sensor or the like, such as a capacitance input device associated with the handle of an automobile or the like, a molded product made of an ABS resin or the like, or a decorative molded product prepared by providing the above molded product with a decorative layer through the lamination or transfer of a film, or the like is used for the insulating substrates 11 and 21.

For example, when employing the present invention in a transparent touch panel such as a membrane input device that brings the two electrode films (transparent conductive films) 12 and 22 for conduction by applying pressure, it is preferable to use a substrate (for example, a transparent resin film) that is flexible against the external force from the input side as the insulating substrate 11 in the input side, whereas it is preferable to use a substrate with a hardness equal to or harder than the predetermined level (for example, equal to or harder than the insulating substrate 11) for easily supporting the conductive substrate 10 via the dot spacer 30 as the insulating substrate 21 in the image display device side.

In addition, the transparent conductive films 12 and 22 in a pair of conductive substrates 10 and 20 are arranged so as to face each other in close proximity with a space therebetween provided by the dot spacer 30. Further, when the pressure is applied to the conductive substrate 10 from the input side towards the image display device side, the insulating substrate 11 and the transparent conductive film 12 of the conductive substrate 10 deflect, while the transparent conductive film 12 can be brought into contact with the transparent conductive film 22 of the conductive substrate 20. It is configured so that electrical signals are generated due to this contact.

Figure 2:
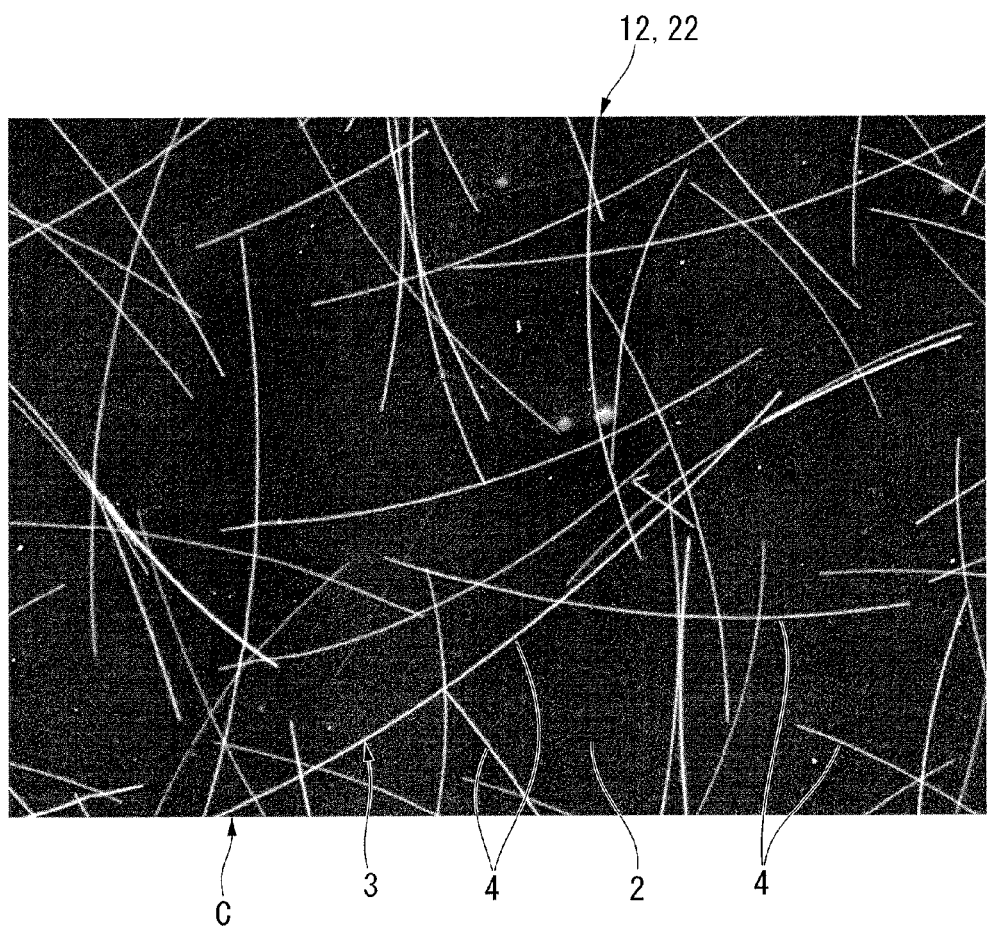
FIG. 2 is an enlarged photograph for explaining a mesh member (conductive portion) and a transparent conductive layer, prior to the laser processing, of the transparent conductive film according to an embodiment of the present invention.

In addition, as shown in FIG. 2, the transparent conductive films 12 and 22 include a transparent base material 2 that has insulation properties, and a mesh member 3 that is made of a conductive metal and provided inside the transparent base material 2. The transparent base material 2 is made of a curable resin which is capable of being filled (impregnated), when in a liquid state, within the strands (fibers) of the mesh member 3 to be described later, and is cured, for example, by heat, ultraviolet light, electron beams, radiations, or the like.

In addition, the mesh member 3 is constituted of a plurality of metal microfibers 4 that are dispersed and electrically connected with each other within the transparent base material 2. More specifically, these metal microfibers 4 are irregularly extended in different directions from each other along the direction of the surface (the surface where the transparent conductive film 12 or 22 is formed) of the insulating substrate 11 or 21, and are also densely arranged to an extent so that at least a portion thereof overlaps each other (comes into contact with each other), and thus these metal microfibers 4 are electrically linked (connected) with each other due to such an arrangement.

That is, the mesh member 3 is constituting a conductive, two dimensional network on the surface of the insulating substrates 11 and 21, thereby forming a region in the transparent base material 2 where the mesh member 3 is arranged as a conductive portion C. In addition, the metal microfibers 4 of the mesh member 3 include a portion which is embedded within the transparent base material 2 and a portion which is protruded from the surface of the transparent base material 2.

Specific examples of such metal microfibers 4 include metal nanowires and metal nanotubes that are made of copper, platinum, gold, silver, nickel, or the like. In the present embodiment, as the metal microfibers 4, a metal nanowire (silver nanowire) that is mainly composed of silver is used. The metal microfibers 4 are formed, for example, so that their diameter is about 0.3 to about 100 nm and their length is about 1 μm to about 100 μm.

Note that as the mesh member 3, fiber materials (metal microfibers) other than the aforementioned metal microfibers 4, such as silicon nanowires, silicon nanotubes, metal oxide nanotubes, carbon nanotubes, carbon nanofibers and graphite fibrils may be used and these may also be dispersed and connected.

Figure 3:
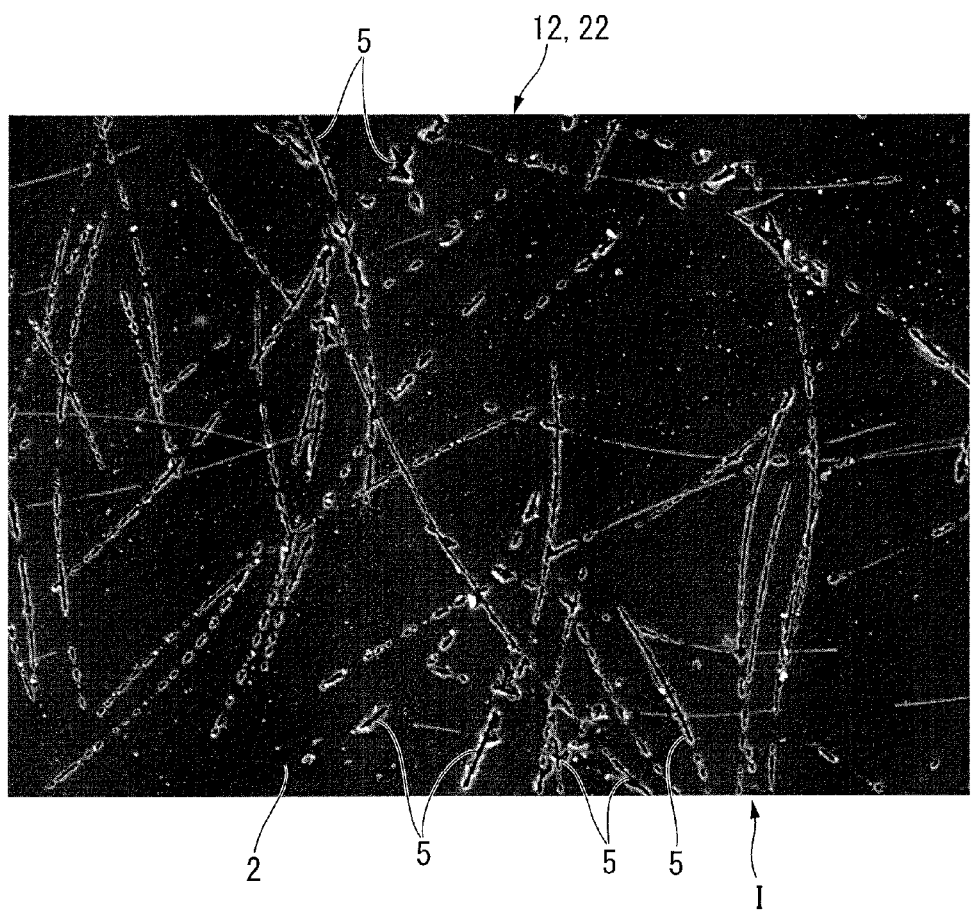
FIG. 3 is an enlarged photograph for explaining a gap (insulating portion) formed by removing the mesh member of the transparent conductive film according to an embodiment of the present invention.

In addition, as shown in FIG. 3, a plurality of gaps 5 are formed in the transparent base material 2 by removing the metal microfibers 4 of the mesh member 3, and a region where these gaps 5 are arranged densely forms an insulating portion I. More specifically, these gaps 5 are formed by irradiating a pulsed laser onto a region where the metal microfibers 4 of the mesh member 3 are arranged, thereby removing the metal microfibers 4 by evaporation.

As the pulsed laser, for example, a so-called femtosecond laser which is an ultrashort pulse laser with a pulse width of less than 1 picosecond can be used. In addition, as the pulsed laser, a YAG laser or a $YVO_4$ laser other than the femtosecond laser may be used. When using a YAG laser or a $YVO_4$ laser, in general, a laser which is widely used as a processing machine having a pulse width of about 5 to about 300 nanoseconds can be used.

These gaps 5 are formed by either being extended or scattered irregularly in different directions from each other along the direction of the surface (the exposed surface) of the transparent base material 2 to form either a long hole shape (long circular hole shape) or a hole shape (circular hole shape), with a portion opened to the aforementioned surface. Specifically, the gaps 5 are arranged so as to correspond to the positions where the metal microfibers 4 removed by evaporation have been arranged, and also the gaps 5 are formed by having a diameter (inner diameter) which is substantially the same as the diameter of the metal microfibers 4 with a length equal to or less than the length of the metal microfibers 4.

More specifically, by completely removing one metal microfiber 4 by evaporation or at least removing a portion thereof by evaporation, a plurality of gaps 5 are formed with spaces therebetween so as to divide the metal microfiber 4 in its extended direction. In other words, a plurality of gaps 5 that are spaced from each other are extended or scattered in corresponding positions in the metal microfiber 4 so as to form a line shape as a whole. It should be noted that only one gap 5 may be formed in one corresponding position in the metal microfiber 4 so as to form a line shape.

In the insulating portion I, due to the formation of these gaps 5, the metal microfiber 4 serving as a conductor is removed, and the aforementioned conductive, two dimensional network is removed (disappeared).

As described above, in the insulating portion I, since the metal microfiber 4 is removed from the transparent base material 2, the conductive portion C and the insulating portion I in the transparent base material 2 have different chemical compositions from each other.

Next, an apparatus and a method for manufacturing a transparent conductive film and a conductive substrate of the present embodiment will be described.

In the method for manufacturing a substrate formed with a conductive pattern (conductive substrate) described in the present embodiment, a method of irradiating an ultrashort pulse laser beam L with a predetermined pattern onto a transparent conductive layer "a" (a transparent conductive film prior to the formation of a conductive pattern) formed on one surface of the insulating substrate 11 (21) is used.

Note that in the following description, a laminate that includes the insulating substrate 11 (21) prior to the laser processing and the transparent conductive layer "a" formed on one surface of the insulating substrate 11 (21) will be referred to as a laminate A for conductive substrate.

Figure 4:
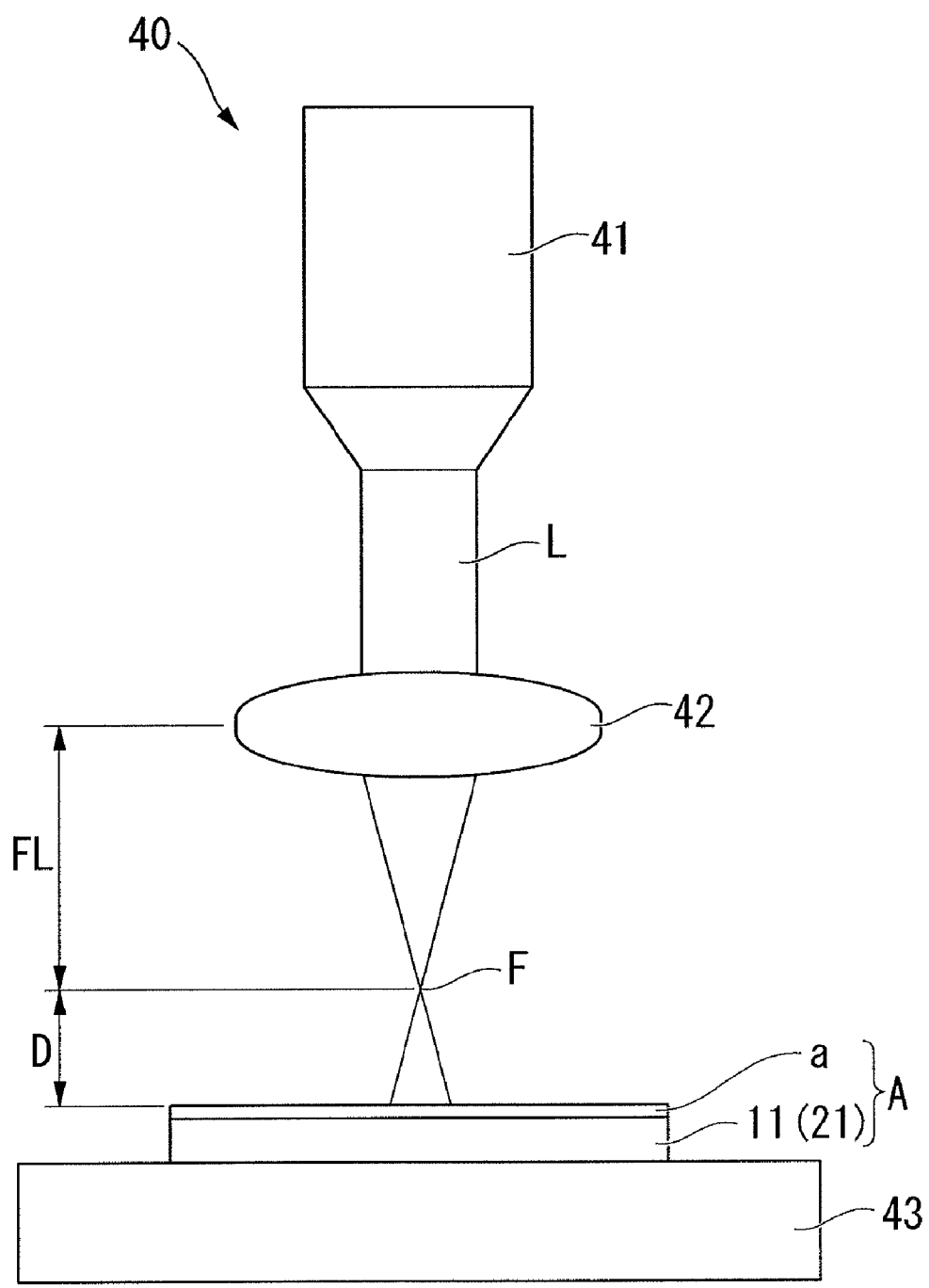
FIG. 4 is a side view showing a simplified apparatus (laser processing machine) for manufacturing a transparent conductive film and a conductive substrate that uses the transparent conductive film according to an embodiment of the present invention.

First, a manufacturing apparatus 40 that is used in the method for manufacturing a substrate formed with a conductive pattern of the present embodiment will be described. As shown in FIG. 4, the manufacturing apparatus 40 includes a laser beam generating unit 41 which generates a laser beam L, a condenser lens 42, such as a convex lens, serving as a light condensing unit which condenses the laser beam L, and a stage 43 on which the laminate A for conductive substrate is mounted.

As the laser beam generating unit 41 in the manufacturing apparatus 40, a unit which generates a laser beam (a laser beam of visible light or infrared) having a wavelength of less than 2 μm and a pulse width of less than 200 nanoseconds is used. In addition, in view of easy use, it is preferable that the pulse width of the laser beam L be from 1 to 100 nanoseconds.

The condenser lens 42 is preferably arranged so that a focal point F of the laser beam L is positioned between the transparent conductive layer "a" and the condenser lens 42. In this manner, the spot diameter of the laser beam L irradiated onto the insulating substrate 11 (21) and the stage 43 becomes larger than the spot diameter of the laser beam L irradiated onto the transparent conductive layer "a", and the energy density of the laser beam L irradiated onto the insulating substrate 11 (21) and the stage 43 reduces, thereby preventing damage to the insulating substrate 11 (21) and the stage 43.

As the condenser lens 42, a lens having a low numerical aperture (NA<0.1) is preferred. That is, by adopting the condenser lens 42 with a numerical aperture of NA<0.1, it becomes easy to set the irradiation conditions for the laser beam L, and it is possible to prevent energy loss associated with the air plasma formation in the focal point F and diffusion of the laser beam L, especially when the focal point F of the laser beam L is positioned between the transparent conductive layer "a" and the condenser lens 42.

Further, in those cases where the transparent conductive layer "a" is, for example, formed by filling (impregnating) the transparent base material 2 made of a resin within the fibers (strands) of the mesh member 3 constituted of the metal microfibers 4, and is also provided on top of the insulating substrate 11 (21) made of a transparent resin film, the metal microfibers 4 embedded within the transparent base material 2 of the transparent conductive layer "a" can be reliably removed by jetting from the surface of the transparent base material 2 in accordance with the aforementioned setting. Therefore, the gaps 5 can be reliably formed in response to the desired shape of the insulating portion I so that an insulating treatment can be reliably and easily carried out.

In addition, since the irradiation spot on the transparent conductive layer "a" at which the laser beam L is irradiated is formed in an areal manner rather than a dotted manner, control of the irradiation energy density so as not to adversely affect the insulating substrate 11 (21) while processing the transparent conductive layer "a" becomes easier, as compared to the conventional methods. Further, it becomes possible to collectively draw an insulating pattern with a large line width in the transparent conductive layer "a", and thus a so-called filling process becomes easy and the width of the above insulating pattern can also be increased, thereby improving the insulation properties of the insulating portion I.

In addition, the stage 43 is configured so as to be movable two dimensionally in the horizontal direction. It is preferable that at least the upper surface side of the stage 43 be constituted of a transparent material or a material exhibiting light absorption characteristics.

In those cases where the insulating substrate 11 (21) is transparent and the output of the laser beam L exceeds 1 W, it is preferable to use a nylon-based resin material or a silicone rubber-based polymer material for the stage 43.

Next, a method for manufacturing a substrate formed with a conductive pattern by employing the aforementioned manufacturing apparatus 40 will be described.

First, the laminate A for conductive substrate is mounted onto the upper surface of the stage 43 so that the transparent conductive layer "a" is arranged above the insulating substrate 11 (21).

Subsequently, the laser beam L is emitted from the laser beam generating unit 41, and the laser beam L is condensed by the condenser lens 42. A portion of the condensed laser beam L where the spot diameter widens beyond the focal point F is irradiated onto the transparent conductive layer "a". At this time, the stage 43 is moved so that irradiation of the laser beam L becomes a predetermined pattern.

The energy density and the irradiation energy per unit area of the laser beam L irradiated onto the transparent conductive layer "a" differ depending on the pulse width of the laser.

In a laser with a pulse width of less than 1 picosecond (for example, a femtosecond laser), the energy density is preferably from $1\times10^{16}$ to $7\times10^{17}$ W/m$^2$, and the irradiation energy per unit area is preferably from $1\times10^5$ to $1\times10^6$ J/m$^2$.

In a laser with a pulse width of 1 to 100 nanoseconds (a YAG laser or a YVO$_4$ laser), the energy density is preferably from $1\times10^{17}$ to $7\times10^{18}$ W/m$^2$, and the irradiation energy per unit area is preferably from $1\times10^6$ to $1\times10^7$ J/m$^2$.

In other words, when the energy density and the irradiation energy are set to values that are smaller compared to the above-mentioned value ranges, the level of insulation of the insulating portion I may not be satisfactory. In addition, when the energy density and the irradiation energy are set to values that are greater compared to the above-mentioned value ranges, the process mark becomes prominent, and thus the substrate will be inadequate in the use of a transparent touch panel, a transparent electromagnetic shield, or the like.

Further, these values are defined as the values obtained by dividing an laser beam output in the processing area by a light condensed spot area in the processing area, and the output can be simply derived by multiplying an output from a laser oscillation device by a loss coefficient of an optical system.

Moreover, the spot diameter area S is defined by the following formula.

$$S = S_0 \times D/\text{FL}$$

$S_0$: Laser beam area condensed by a lens
FL: Focal length of a lens
D: Distance between the surface (upper surface) of the transparent conductive layer "a" and the focal point Here, the distance D is set within a range from 0.2% to 3% of the focal length FL. Preferably, the distance D is set within a range from 0.5% to 2% of the focal length FL. More preferably, the distance D is set within a range from 1.5% to 2% of the focal length FL. By setting the distance D within the above-mentioned value range, removal of the metal microfibers 4 (i.e., formation of the gaps 5) in the insulating portion I can be reliably carried out, an insulating pattern (conductive pattern) that is electrically highly reliable can be formed, and also the occurrence of process marks caused by damage to the insulating substrate 11 (21) can be reliably prevented.

In addition, in view of forming a conductive pattern with high precision, it is preferable to irradiate the laser beam L intermittently a plurality of times onto the same portion in the transparent conductive layer "a". More specifically, the laser beam L is preferably irradiated intermittently from 3 to 500 times, more preferably from 20 to 200 times. Irradiation of three times or more can achieve insulation more reliably, and irradiation of 500 times or less can prevent the removal of a portion of the transparent base material 2 where the laser beam L is irradiated through dissolution or evaporation.

In this manner, the transparent conductive layer "a" is patterned, the transparent conductive film 12 (22) provided with a conductive pattern that includes the conductive portion C and the insulating portion I is formed, and also the laminate A for conductive substrate is formed into a substrate formed with a conductive pattern (conductive substrate) 10 (20).

It should be noted that, in the above description, although the laminate A for conductive substrate is mounted on the mobile stage 43 such as an XY stage to carry out the patterning, the configuration is not limited thereto. That is, for example, by fixing the laminate A for conductive substrate, it is also possible to perform the patterning through a method to relatively move a light condensing member, a scanning method by the laser beam L using a galvanometer mirror or the like, or a combination of these methods.

The laminate A for conductive substrate used in the above-mentioned manufacturing method will be described below.

Among the transparent conductive layer "a" of the laminate A for conductive substrate, examples of an inorganic conductor that constitutes the mesh member 3 include a metal nanowire made of silver, gold, nickel, or the like. In addition, among the transparent conductive layer "a", examples of an insulator that constitutes the transparent base material 2 include transparent thermoplastic resins (such as polyvinyl chloride, vinyl chloride-vinyl acetate copolymers, polymethyl methacrylate, nitrocellulose, chlorinated polyethylene, chlorinated polypropylene, and vinylidene fluoride) and transparent curable resins, such as melamine acrylate, urethane acrylate, epoxy resins, polyimide resins and silicone resins like acryl modified silicate, which are cured by heat, ultraviolet light, electron beams or radiations.

Figure 5:
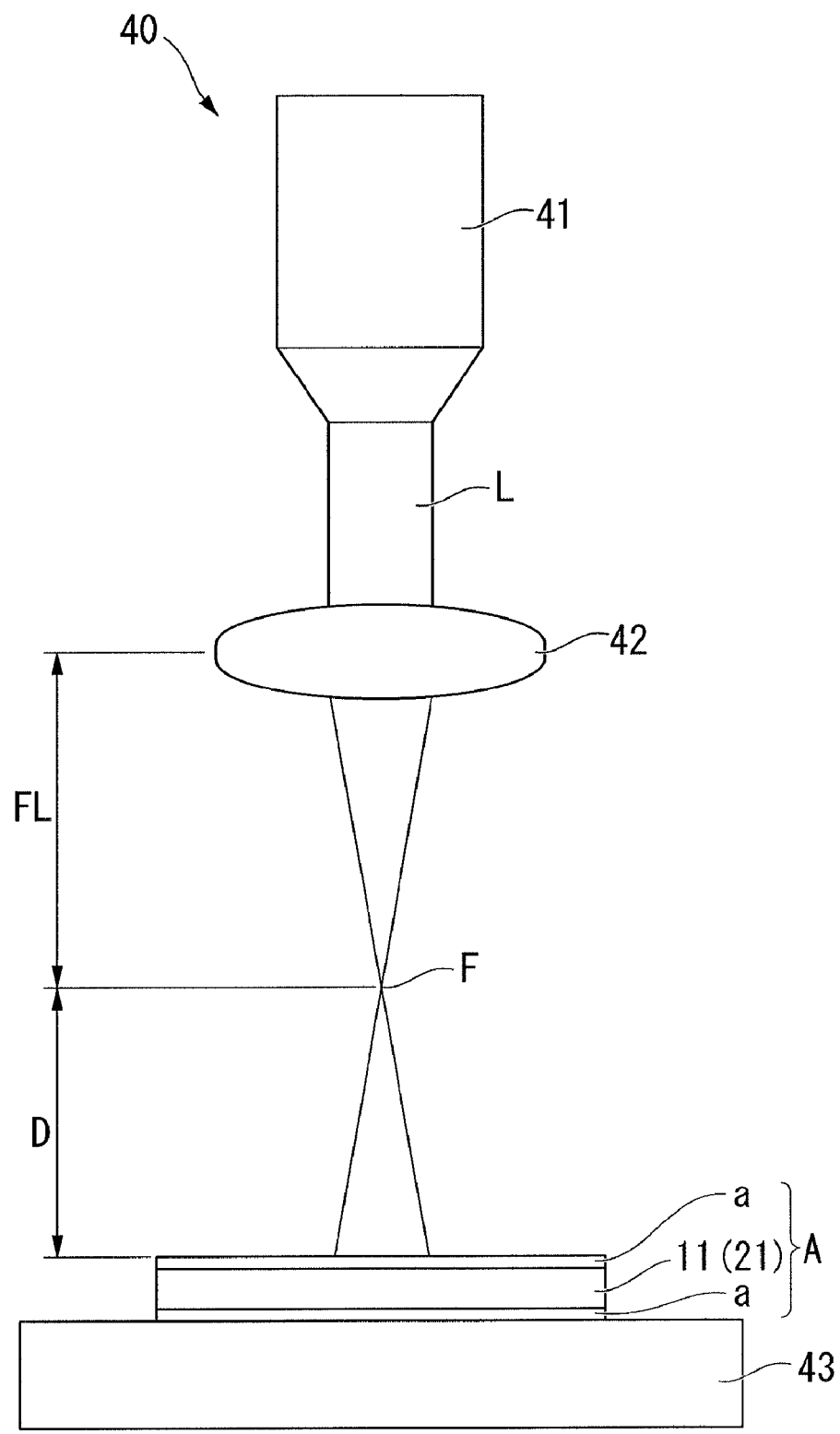
FIG. 5 is a side view showing a modified example of the conductive substrate and the manufacturing apparatus in FIG. 4.

Further, FIG. 5 is a modified example of the present embodiment. In the illustrated example, a pair of transparent conductive layers a is provided on both the upper and lower surfaces of the insulating substrates 11 (21) in the laminate A for conductive substrate. In this case, when using a lens having a focal length FL of 50 mm or more and a numerical aperture of less than 0.2 as the condenser lens 42, the broadening of the laser beam L can be reduced. As a result, positional adjustment of the lens can be easily performed, and also the difference between the spot diameters in the two surfaces of the insulating substrate 11 (21) is reduced, thereby making the energy density irradiated onto the transparent conductive layers a in both surfaces becomes substantially equal, and thus the same insulating pattern can be collectively formed on the transparent conductive layers a in both surfaces.

In addition, when insulating only the transparent conductive layer "a" in one surface side among the transparent conductive layers a formed in both surfaces of the insulating substrate 11 (21), a lens having a numerical aperture of more than 0.5 may be used as the condenser lens 42.

As described above, with respect to the transparent conductive film 12 (22) and the conductive substrate 10 (20) using this transparent conductive film according to the present embodiment, in the transparent base material 2, a region in which the conductive mesh member 3 is arranged is formed as the conductive portion C, and a region in which the gaps 5 formed due to the removal of the mesh member 3 are arranged is formed as the insulating portion I. That is, in the conductive portion C, conduction is ensured due to the mesh member 3 made of a metal, whereas in the insulating portion I, an electrically insulating state can be reliably achieved due to the gaps 5 formed by the removal of the mesh member 3.

More specifically, in the conventional transparent conductive film, since the mesh member 3 constituted of metal nanowires that are dispersed and electrically connected with each other within the transparent base material 2 or the like remains not only in the conductive portion C but also in the insulating portion I, it has been difficult to reliably insulate the insulating portion I. On the other hand, according to the configuration of the present embodiment, since the mesh member 3 (the metal microfibers 4) in the insulating portion I is removed by being replaced with the gaps 5 so that the insulating portion I is reliably insulated, electrical characteristics (performance) in the transparent conductive film 12 (22) are stabilized, and the reliability with respect to the product (i.e., the input device 1) is enhanced.

Moreover, in the insulating portion I, the mesh member 3 is removed and the gaps 5 with a shape that corresponds to (follows) the removed mesh member 3 (the metal microfibers 4) are formed. That is, by forming such gaps 5, the conductive portion C and the insulating portion I become similar to each other in terms of the color tone and transparency, which makes it difficult to distinguish (visually identify) these portions from one another by naked eyes or the like.

In addition, since the mesh member 3 is constituted of the metal microfibers 4 that are dispersed and electrically connected with each other within the transparent base material 2, the mesh member 3 can be formed relatively easily using the metal microfibers made of a metal nanowire, a metal nanotube or the like which is commercially available.

Moreover, when using a fiber that is mainly composed of silver as the metal microfiber 4 as in the present embodiment, it is possible to obtain the metal microfibers 4 relatively easily to be used as the mesh member 3. Further, a common laser processing machine which is commercially available can be used when removing the mesh member 3 (the metal microfibers 4) in the insulating portion I by laser processing. Furthermore, the metal microfibers 4 that are mainly composed of silver are more preferred, since they exhibit a high light transmittance and are also capable of forming a conductive pattern that exhibits a low surface resistivity and is colorless and transparent.

In addition, when an ultrashort pulse laser (femtosecond laser) with a pulse width of less than 1 picosecond is used as the laser processing machine (manufacturing apparatus) 40, since the conductive pattern (insulating pattern) in the conductive substrate 10 (20) after laser processing can be reliably made inconspicuous, which is more desirable.

As described above, according to the transparent conductive film 12 (22) and the conductive substrate 10 (20) using this transparent conductive film of the present embodiment, the conductive pattern is hardly visible, and also the conductive portion C exhibits low resistance while the insulating portion I is reliably insulated in the conductive pattern, and thus a stable electrical performance can be achieved.

It should be noted that the present invention is not limited to the aforementioned embodiment, and various modifications can be made within the scope of not departing from the spirit or scope of the present invention.

For example, although it was configured so that the insulating substrates 11 and 21 were both colorless and transparent in the aforementioned embodiment, either one or both of these insulating substrates 11 and 21 may be colored and transparent to a certain extent.

In addition, although it was configured so that the mesh member 3 is constituted of a plurality of metal microfibers 4 that are dispersed and electrically connected with each other within the transparent base material 2, the configuration is not limited thereto. That is, the mesh member 3 may be, for example, a wire grid which is formed by etching a conductive metal film into a grid-like form.

In addition, it may be configured so that a functional layer such as an adhesive layer, an antireflective layer, a hard coat layer and a dot spacer layer is arbitrarily provided in the conductive substrate 10 and 20.

Especially when using a laser with a fundamental wave having a wavelength which is close to 1,000 nm such as a YAG laser and a YVO$_4$ laser and also using an acrylic polymer material as the above-mentioned functional layer, it is preferable to provide a functional layer following laser irradiation from the viewpoint of appearance.

EXAMPLES

The present invention will be described below in more detail using Examples. However, the present invention is not limited to these Examples.

Production Example 1

Preparation of Conductive Film (Conductive Substrate) that Includes Silver Nanowires (Example of the Present Invention)

A transparent polyester (PET) film (insulating substrates 11 and 21) having a thickness of 100 μm was coated with the Ohm (product name) ink (metal microfibers 4) manufactured by Cambrios Technologies Corporation and dried, and a polyester resin ink (transparent base material 2) which was ultraviolet curable was then coated thereon, followed by a drying/ultraviolet treatment, thereby forming a transparent conductive layer "a" which was abrasion resistant and included a conductive two dimensional network (mesh member 3) constituted of silver fibers (metal microfibers 4) with a wire diameter of about 50 nm and a length of about 15 μm on top of the PET film (FIG. 2).

The surface resistance and the light transmittance of the transparent conductive layer "a" in this conductive film (conductive substrates 10 and 20) that included the silver nanowires was 230Ω/□ and 95%, respectively.

Subsequently, the conductive film that included the silver nanowires was cut into a rectangular shape with a length of 80 mm and a width of 50 mm, thereby forming a test piece of conductive film that included the silver nanowires.

Production Example 2

Preparation of Silver-Deposited Conductive Film (Comparative Example)

Figure 6:
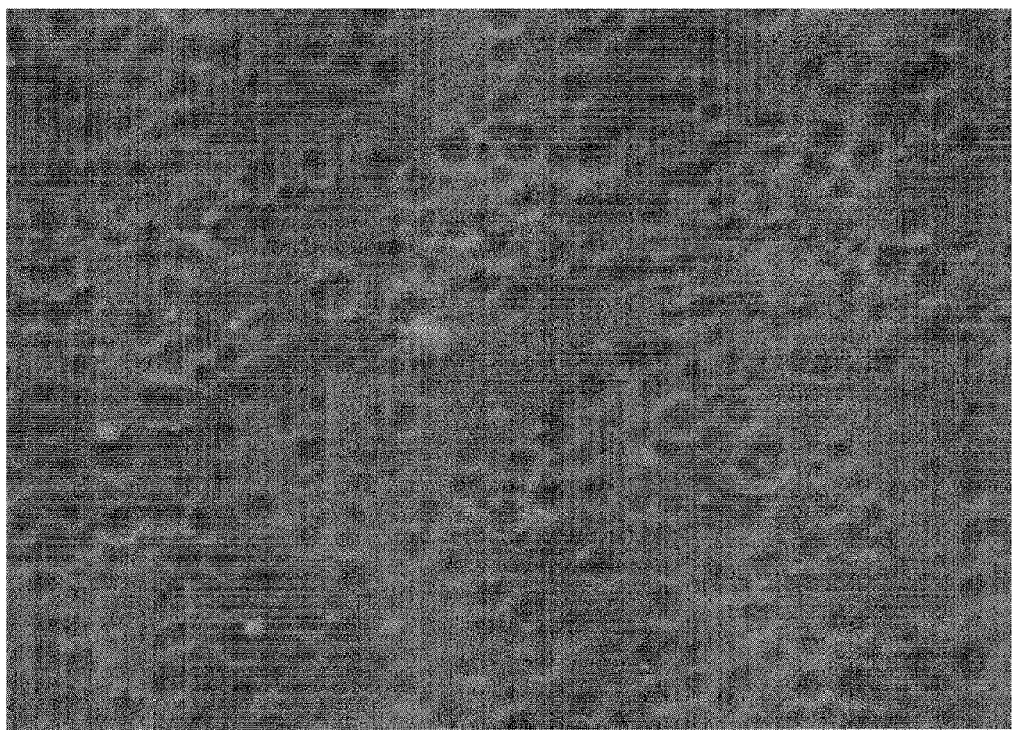
FIG. 6 is an enlarged photograph for explaining a conductive portion and a transparent conductive layer, prior to the laser processing, of a transparent conductive film in a Comparative Example.

A transparent PET film having a thickness of 100 μm was prepared, which was provided with a hard coat layer composed of an acrylic silicone resin on one surface thereof, and a zinc oxide film was formed with a thickness of 60 nm on a surface which was opposite to the surface where the hard coat layer was provided, using a magnetron sputtering apparatus. Subsequently, a silver film having a thickness of 27 nm was formed on the surface of the zinc oxide film using the magnetron sputtering apparatus. Further, a zinc oxide film having a thickness of 60 nm was formed on the surface of the silver film in the same manner as that adopted for forming the above-mentioned zinc oxide film (FIG. 6). As a result, a transparent conductive layer including a conductive two dimensional network constituted of zinc oxide films and a silver film was formed on top of the PET film. More specifically, as shown in FIG. 6, a silver deposited layer (silver film) was formed so that a plurality of granular materials were assembled and connected while leaving a certain gaps therebetween.

The surface resistance and the light transmittance of the transparent conductive layer in this silver-deposited conductive film was 95Ω/□ and 85%, respectively.

Subsequently, the silver-deposited conductive film was cut into a rectangular shape with a length of 80 mm and a width of 50 mm, thereby forming a test piece of silver-deposited conductive film.

Experimental Example 1

By using a femtosecond laser (manufacturing apparatus 40) with a wavelength of 750 nm, an output of 10 mW, a pulse width of 130 femtoseconds, a repetition frequency of 1 kHz and a beam diameter of 5 mm, as well as a condenser lens 42 with a focal length FL of 100 mm and a galvanometer minor, it was adjusted so that the focal point F of the laser beam L was set to a position spaced by 1.5 mm from the surface of the aforementioned transparent conductive layer in a test piece, which was prepared by arranging a conductive substrate (the aforementioned conductive film that included silver nanowires or the aforementioned silver-deposited conductive film) on top of a glass plate having a thickness of 5 mm, towards the condenser lens 42 side, and a light condensing point was then moved so as to transverse in the width direction of the test piece at 1 mm/sec, thereby drawing a straight line (i.e., insulating pattern formation).

Experimental Example 2

A straight line was drawn under the same conditions as those described for Experimental Example 1 with the exception that the focal point F of the laser beam L was set on the surface of the transparent conductive layer.

Experimental Example 3

By using a YVO$_4$ laser (manufacturing apparatus 40) with a wavelength of 1,064 nm, an output of 12 W, a pulse width of 20 nanoseconds, a repetition frequency of 100 kHz and a beam diameter of 6.7 mm, as well as a condenser lens 42 with a focal length FL of 300 mm and a galvanometer mirror, it was adjusted so that the focal point F of the laser beam L was set to a position spaced by 3 mm from the surface of the aforementioned transparent conductive layer in a test piece, which was prepared by arranging a conductive substrate (the aforementioned conductive film that included silver nanowires or the aforementioned silver-deposited conductive film) on top of the Duracon (registered trade mark) resin, towards the condenser lens 42 side, and a light condensing point was then moved so as to transverse in the width direction of the test piece at 100 mm/sec, thereby drawing a straight line.

Experimental Example 4

A straight line was drawn under the same conditions as those described for Experimental Example 3 with the exception that the moving speed of the light condensing point was adjusted to 300 mm/sec.

Experimental Example 5

A straight line was drawn under the same conditions as those described for Experimental Example 3 with the exceptions that the output was adjusted to 3.6 W and the moving speed of the light condensing point was adjusted to 300 mm/sec.

Experimental Example 6

A straight line was drawn under the same conditions as those described for Experimental Example 4 with the exception that the focal point F of the laser beam L was set on the surface of the transparent conductive layer.

Experimental Example 7

A straight line was drawn repeatedly on the same place five times under the same conditions as those described for Experimental Example 4.

Experimental Example 8

By using a carbon dioxide laser (continuous oscillation) with a wavelength of 10.6 μm and an output of 15 W, as well as a condenser lens 42 with a focal length FL of 300 mm and a galvanometer mirror, it was adjusted so that the focal point F of the laser beam L was set to a position spaced by 3 mm from the surface of the aforementioned transparent conductive layer in a test piece towards the condenser lens 42 side, and a light condensing point was then moved so as to transverse in the width direction of the test piece at 300 mm/sec, thereby drawing a straight line.

With respect to the substrate formed with a conductive pattern (conductive substrate) obtained by the above experiment, a portion irradiated with the laser beam L was placed within a tester to measure the electrical resistance value. In addition, the visibility (process mark) of conductive pattern was evaluated by visual observation. The evaluation results are shown in Table 1.

It should be noted that the evaluation was conducted based on the following criteria (A, B, C and D).
A: Excellent; A substrate which is reliably insulated with an electrical resistance value of more than 10 MΩ, and also with a conductive pattern that is completely invisible.
B: Good; A substrate which is reliably insulated with an electrical resistance value of more than 10 MΩ, and also with a conductive pattern that is hardly visible (a substrate in which process mark is substantially invisible when configured into a touch panel).
C: Acceptable; A substrate which is reliably insulated with an electrical resistance value of more than 10 MΩ, but with a conductive pattern that is visible (a level of visibility such that a product can be used only when configured into a touch panel).
D: Unacceptable; A substrate which is inadequately insulated with an electrical resistance value of 10 MΩ or less, or a substrate with burns and holes formed to an extent so as to be visually confirmed, in other words, a substrate which cannot be used as a product.

the gaps 5 (FIG. 3). Especially in the Experimental Example 1, absolutely no change in the irradiation region was observed to yield favorable results. Further, when the irradiation region was observed in the Experimental Examples 2 and 6, it was confirmed that the transparent conductive layer "a" itself was removed from the PET film by ablation.

Figure 7:
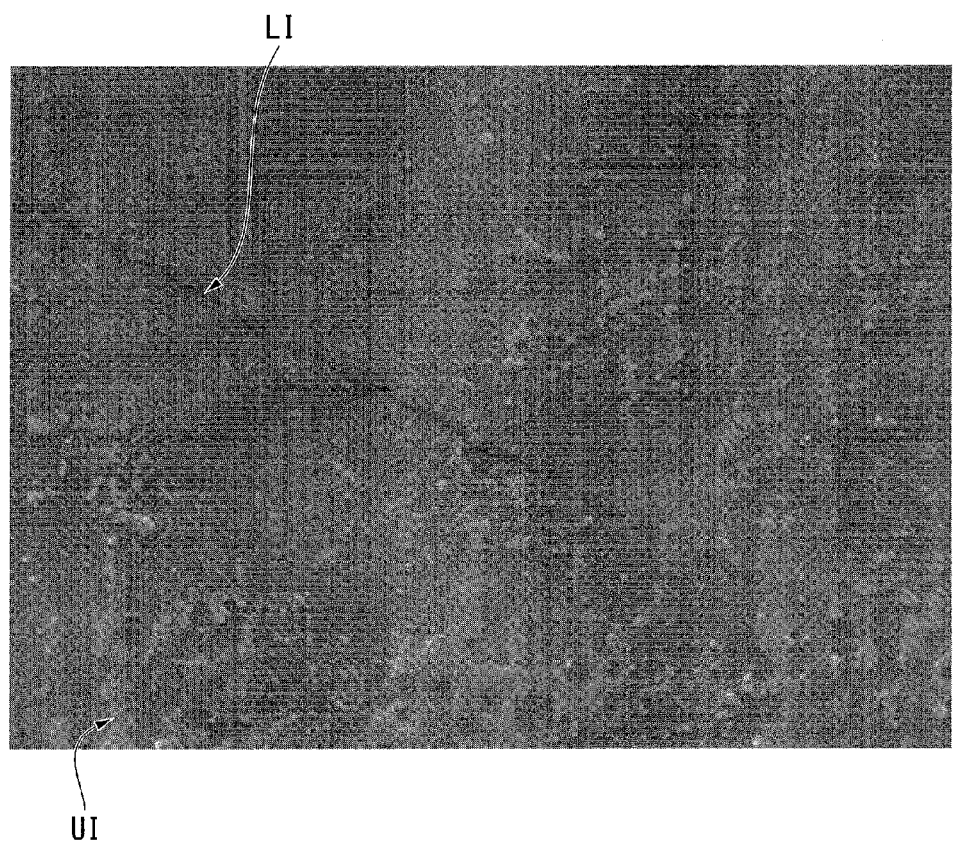
FIG. 7 is an enlarged photograph for explaining an irradiation region (insulating portion) of the transparent conductive film in a Comparative Example.

On the other hand, in the Experimental Examples 1 to 7 using the conductive substrate according to Production Example 2 (Comparative Example), the grades A and B could not be attained. It should be noted that in the Experimental Examples 2, 3, and 7 using the conductive substrate according to Production Example 2, within the irradiation region (irradiated area indicated by the symbol LI in FIG. 7), it was confirmed that the silver deposition layer on the surface of the PET film were removed in a wide range and the insulation properties were secured therein, in contrast to the conductive unirradiated region (unirradiated area indicated by the symbol UI in FIG. 7).

In addition, in the Experimental Example 8, clear process marks remained in the conductive pattern (grade D), and the resultant could not achieve the standard to be adopted as a product.

Production Example 3

Preparation of Touch Panel (Input Device) (Example of the Present Invention)

Next, a production example for a touch panel (wiring substrate) that employs a transparent conductive film and a conductive substrate of the present invention will be described.

First, a commercially available silver paste was printed, into a band-like shape by screen printing, on top of the trans-

TABLE 1

| Irradiation conditions | Example | | | | | | | |
|---|---|---|---|---|---|---|---|---|
| | 1 | 2 | 3 | 4 | 5 | 6 | 7 | 8 |
| Laser processing machine | Femtosecond laser | | | YVO$_4$ laser | | | | Carbon dioxide laser (continuous oscillation) |
| Wavelength | 750 nm | | | 1,064 nm | | | | 10 μm |
| Output | 10 mW | | 12 W | 3.6 W | | 12 W | | 15 W |
| Focal length (FL) | 100 mm | | | 300 mm | | | | 300 mm |
| Distance (D) between transparent conductive layer surface and focal point | 1.5 mm above | 0 mm (on the surface) | | 3 mm above | | 0 mm (on the surface) | 3 mm above | 3 mm above |
| Moving speed of light condensing point | 1 mm/sec | | 100 mm/sec | 300 mm/sec | | | | 300 mm/sec |
| Line drawing frequency | 1 | | | 1 | | | 5 | 1 |
| Evaluation of conductive pattern of Production Example 1 (present invention) | A | C | B | D (not insulated) | D (not insulated) | C | B | D (clear process marks) |
| Evaluation of conductive pattern of Production Example 2 (Comparative Example) | D (not insulated) | C | C | D (not insulated) | D (not insulated) | D (burnt) | C | — |

Figure 8:
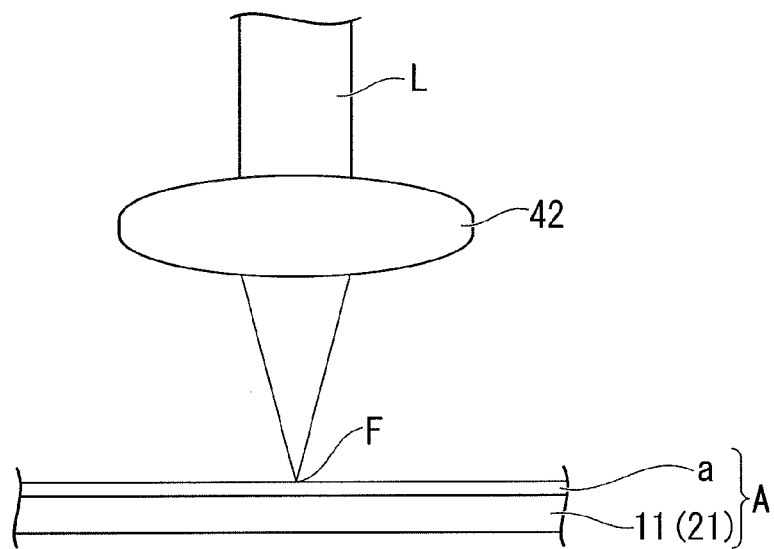
FIG. 8 is a side view for explaining an Example (Production Example) of manufacturing an input device by using the transparent conductive film and the conductive substrate according to the present invention.

As indicated in Table 1, in the Experimental Examples 1, 3 and 7 using the conductive substrate according to Production Example 1 (Example of the present invention), changes in the transparency, color tone or the like in the irradiation region could not be observed by a light microscope. In addition, when the irradiation region was observed using an electron microscope, it was confirmed that only the silver nanowires were evaporated from the transparent base material 2 to form parent conductive layer "a" of the laminate A for conductive substrate, thereby forming a connector pattern. Further, as shown in FIGS. 8 and 10, under the conditions described for the Experimental Example 2, two lines of markings, each line constituted of six of "+" markings having a pitch of 5 mm and a length of 1 mm, were provided with an interval of 25 mm on top of the transparent conductive layer "a" as the landmarks for the input area.

Figure 9:
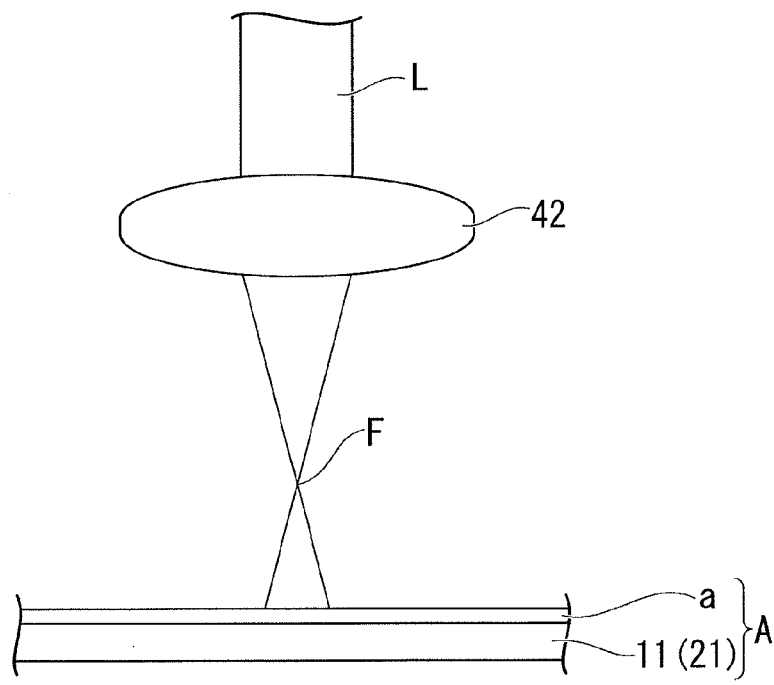
FIG. 9 is a side view for explaining an Example (Production Example) of manufacturing an input device by using the transparent conductive film and the conductive substrate according to the present invention.
Figure 10:
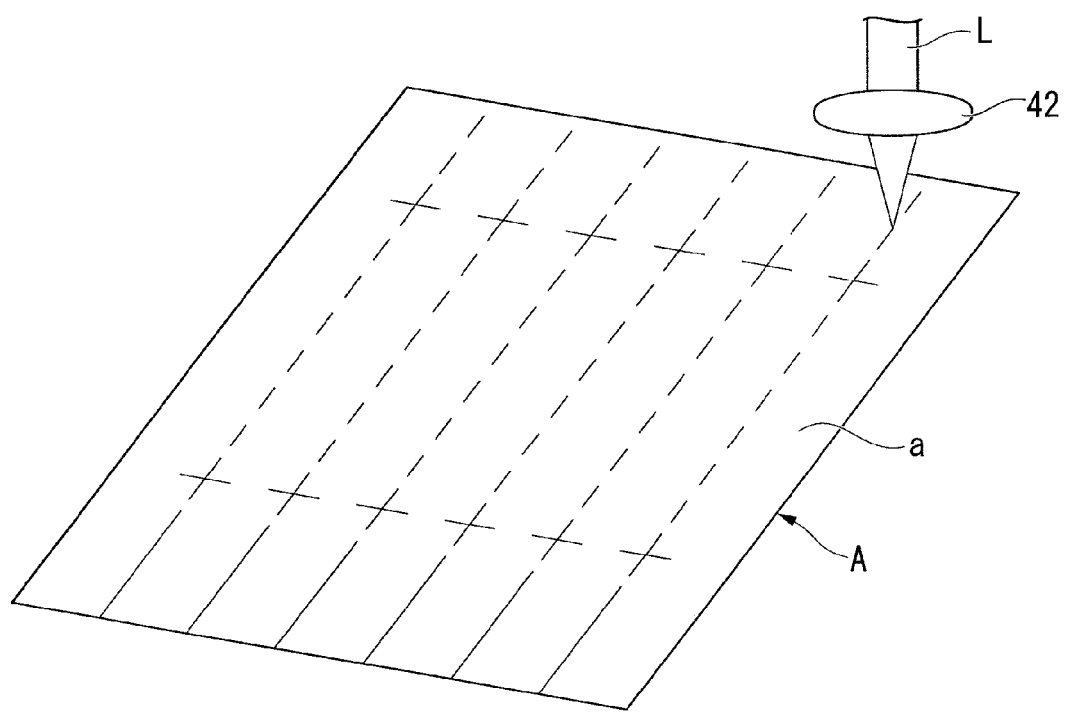
FIG. 10 is a perspective view for explaining an Example (Production Example) of manufacturing an input device by using the transparent conductive film and the conductive substrate according to the present invention.

Subsequently, as shown in FIGS. 9 and 10, six laser rays (laser beam L) having a length of 35 mm were irradiated starting from the "+" markings under the irradiation conditions described for the Experimental Example 1, thereby forming a wiring pattern within the input area.

Then, an insulating pattern was formed by transversing the connector pattern starting from the "+" markings under the conditions described for the Experimental Example 2, thereby obtaining a wiring substrate for a touch panel which had a 25 mm square input area. Note that this wiring substrate for a touch panel was prepared in pairs, and when tested with a tester, these wiring substrates for a touch panel were insulated among the wiring patterns at the end of the input area.

Subsequently, a plurality of dot spacers 30 having a diameter of 30 μm and a height of 8 μm and constituted of an acrylic resin was formed with a pitch of 1 mm in one of these wiring substrates for a touch panel by screen printing using the "+" markings as landmarks (refer to FIG. 1).

Then, the wiring substrate for a touch panel formed with the dot spacer 30 and the wiring substrate for a touch panel with no dot spacer 30 were cut into a predetermined shape, respectively, and the four sides of these substrates were pasted together using a commercially available two-sided adhesive tape so as to face the respective transparent conductive films 12 (22) with each other, thereby forming a transparent touch panel of a membrane type (input device 1) (refer to FIG. 1).

Evaluation

With respect to the touch panel 1 manufactured in this manner, it was confirmed that both the dot spacers 30 and the wiring patterns were inconspicuous, and also that the touch panel functioned as a key matrix.

Production Example 4

Preparation of Touch Panel (Comparative Example)

When the laminate A for conductive substrate in which the dot spacer 30 was printed in advance was patterned under the same conditions as those described for Production Example 3, the presence of black colored dot spacer 30 was verified by visual observation.

| DESCRIPTION OF THE REFERENCE SYMBOLS | |
| --- | --- |
| 2: | Transparent base material |
| 3: | Mesh member |
| 4: | Metal microfiber |
| 5: | Gap |
| 10, 20: | Conductive substrate |
| 11, 21: | Insulating substrate |
| 12, 22: | Transparent conductive film |
| C: | Conductive portion |
| I: | Insulating portion |

The invention claimed is:

1. A transparent conductive film comprising:
a transparent base material having insulation properties; and
a mesh member made of a conductive metal and wherein the mesh member is provided inside the transparent base material,
wherein the transparent base material comprises a conductive portion comprising the mesh member, and wherein the transparent base material defines a plurality of gaps, and said gaps are formed by removal of the mesh member therefrom, wherein the transparent base material comprises an insulating portion at a location where the gaps are arranged.

2. The transparent conductive film according to claim 1, wherein the mesh member is made of metal microfibers that are dispersed and electrically connected with each other in the transparent base material.

3. The transparent conductive film according to claim 2, wherein the metal microfibers are mainly composed of silver.

4. The transparent conductive film according to claim 1, wherein the gap in the insulating portion is formed by irradiating a pulsed laser onto the mesh member.

5. The transparent conductive film according to claim 4, wherein the pulsed laser is an ultrashort pulse laser with a pulse width of less than 1 picosecond.

6. The transparent conductive film according to claim 4, wherein the pulsed laser is a YAG laser or a YVO4 laser.

7. The transparent conductive film according to claim 2, wherein the gap in the insulating portion is formed by irradiating a pulsed laser onto the mesh member.

8. The transparent conductive film according to claim 3, wherein the gap in the insulating portion is formed by irradiating a pulsed laser onto the mesh member.

9. The transparent conductive film according to claim 7, wherein the pulsed laser is an ultrashort pulse laser with a pulse width of less than 1 picosecond.

10. The transparent conductive film according to claim 8, wherein the pulsed laser is an ultrashort pulse laser with a pulse width of less than 1 picosecond.

11. The transparent conductive film according to claim 7, wherein the pulsed laser is a YAG laser or a YVO4 laser.

12. The transparent conductive film according to claim 8, wherein the pulsed laser is a YAG laser or a $YVO_4$ laser.

13. A conductive substrate comprising the transparent conductive film of any one of claims 1 to 6, and 7-12 provided at least on one surface of an insulating substrate.

14. The conductive substrate according to claim 13, wherein the insulating substrate is transparent.

* * * * *